Oct. 7, 1947.　　　E. N. DINGLEY, JR　　　2,428,360
ELECTRICAL GUIDANCE SYSTEM FOR SURFACE VESSELS
Filed Jan. 16, 1945　　　2 Sheets-Sheet 1

INVENTOR
EDWARD N. DINGLEY, JR.
BY
ATTORNEY

Oct. 7, 1947.  E. N. DINGLEY, JR  2,428,360
ELECTRICAL GUIDANCE SYSTEM FOR SURFACE VESSELS
Filed Jan. 16, 1945  2 Sheets-Sheet 2

INVENTOR
EDWARD N. DINGLEY, JR.
BY
ATTORNEY

Patented Oct. 7, 1947

2,428,360

UNITED STATES PATENT OFFICE 2,428,360

ELECTRICAL GUIDANCE SYSTEM FOR SURFACE VESSELS

Edward N. Dingley, Jr., United States Navy

Application January 16, 1945, Serial No. 573,093

2 Claims. (Cl. 177—385)

(Granted under the act of March 3, 1883, as amended April 30, 1928; 370 O. G. 757)

My invention relates broadly to electrical guidance systems by means of which surface vessels may be guided safely along a predetermined course in restricted or inland waters at times of low or zero visibility.

My invention relates chiefly to circuit arrangements in which the magnitude and direction, of an electromagnetic field emanating from a submerged cable, is indicated visually at a point on the water's surface occupied by a surface vessel.

One of the objects of my invention is to provide a guidance system by means of which definite courses or channels may be navigated in fog or darkness.

Another object of my invention is to provide portable equipment suitable for rapid installation aboard vessels and easy removal therefrom, which will at all times make possible the determination, by the navigator or pilot of the vessel, of the exact position of the vessel relative to a predetermined course or channel.

Other and further objects of my invention will be understood from the following specification and by reference to the accompanying drawings, in which.

Figures 1, 2:
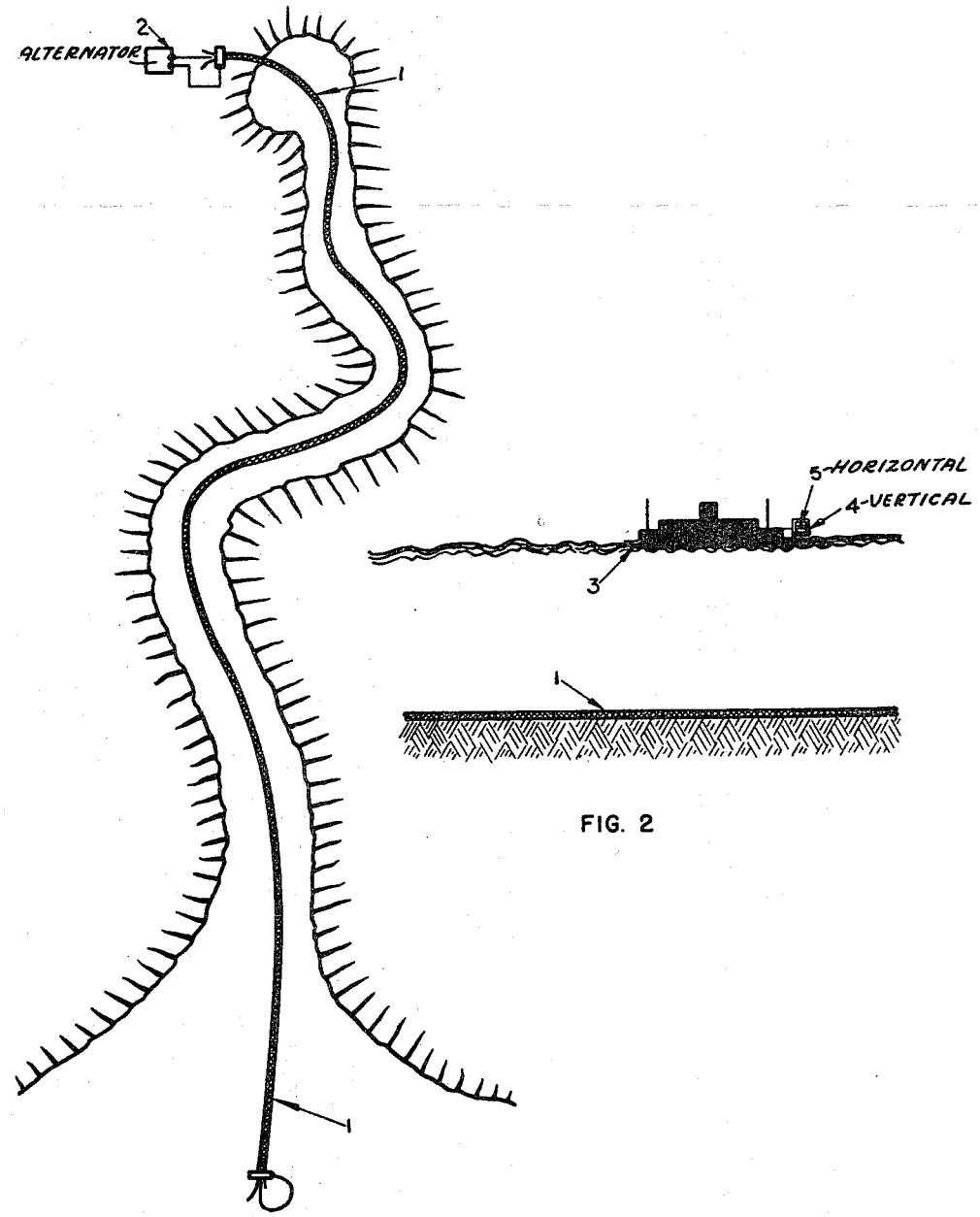
Fig. 1 is a plan view of a channel provided with a guidance cable.
Fig. 2 is a side elevation of a portion of the channel provided with a guidance cable.

Fig. 1 represents the plan view of a channel wherein the single conductor armored cable I is laid on the bottom of the channel to be navigated. At one end of the cable, an alternator 2 provides an alternating potential between the center conductor and the armor of cable I thus causing an alternating current flow through cable I which has its inner conductor connected to its armor at the end opposite from the generator. An alternating current of 5 amperes at a frequency of 500 cycles per second flowing in cable I has been found to be satisfactory for guidance purposes as stated in two articles on the subject published in the Proceedings of the Institute of Radio Engineers, vol. 9, No. 4, August 1921, PP273, and vol. 10, No. 1, February 1922, PP3. The power required to establish such a current is relatively small. For example, the 500 C. P. S. characteristics per 1000 feet of U. S. Coast Guard type 111 single conductor No. 8 AWG armored submarine cable are as follows: 1.35 ohms loop resistance, 227 microhenries loop inductance, 0.037 microfarad capacitance, 214 micromhos shunt conductance, $114e^{-j30°.5}$ ohms surge impedance. The input impedance of a 174,000 foot length with the far end short circuited is $129e^{-j37°.1}$ ohms or $103-j78$ ohms. With a 24.8 millihenry inductor in series with the input to the cable, the load on the generator will be $103+j0$ ohms. For a cable input current of 5 amperes, the generator potential must be 515 volts and the generator output power must be 2575 watts. The current at the short circuited end of the cable will be 3.2 amperes or 64% of the input current.

My invention deals with means for detecting and utilizing the magnetic fields surrounding the guidance cable I.

In Fig. 2 there is shown a side elevation of a portion of the cable I together with a surface vessel 3 having mounted thereon, preferably protruding beyond the bow, two loops 4 and 5, of which, loop 4 is vertical and lying in the fore and aft plane and loop 5 is horizontal. It is preferable, but not mandatory, that the plane of loop 4 should bisect the plane of loop 5.

Loops 4 and 5 each consist of approximately 1000 turns of small gauge insulated wire encased in waterproof frames. Each loop has a diameter of approximately 2 feet.

Figure 3:
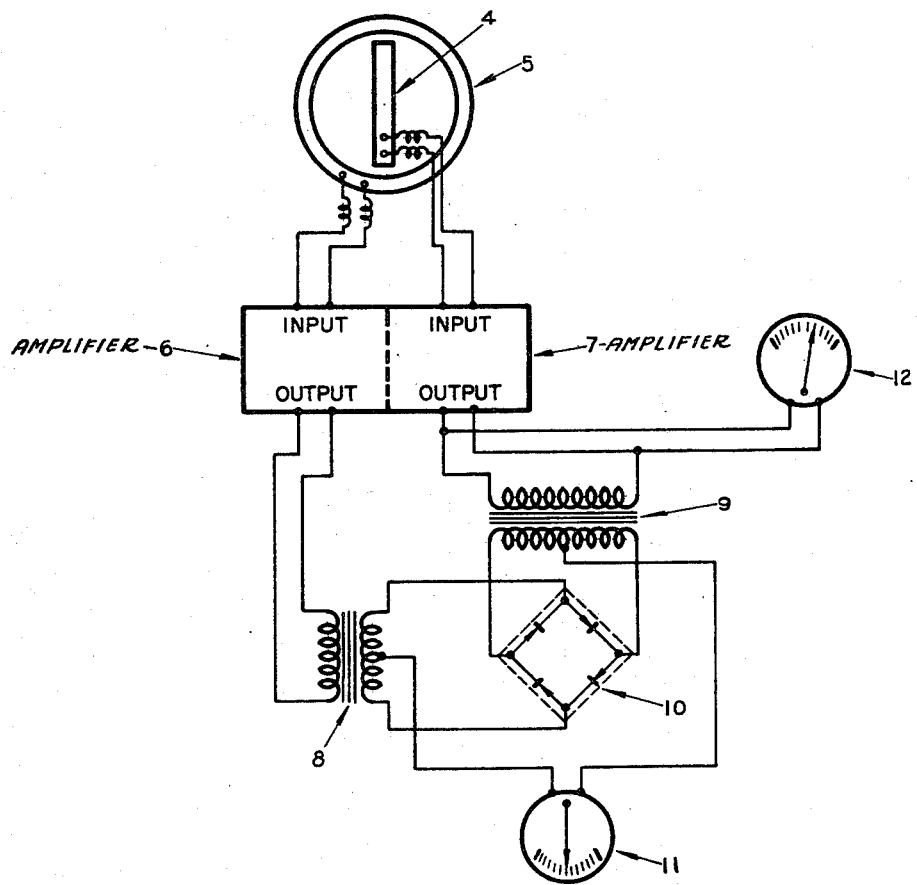
Fig. 3 is a circuit diagram of one embodiment of my invention.

In Fig. 3, the loops 5 and 4 are shown connected, by appropriate wires, respectively to the input terminals of the linear audio frequency amplifiers 6 and 7. These amplifiers are identical and may be of any conventional type such as the one disclosed in U. S. Patent 2,338,100. It is preferable to use amplifiers which are tuned to the frequency of the current in the guidance cable.

As shown in Fig. 3, the output of amplifier 6 is connected to the primary of isolating transformer 8 and the output of amplifier 7 is connected to the primary of isolating transformer 9. The secondary terminals of transformer 8 are connected to opposite corners of a bridge rectifier 10 and the secondary terminals of transformer 9 are connected to the other two opposite corners of the bridge rectifier 10. The center taps of secondary windings of transformers 8 and 9 are connected together through the zero-center D. C. current indicating instrument 11. The output terminals of amplifier 7 are shown also connected to alternating current voltmeter 12.

It is well known to those skilled in the art that when instrument 11 is connected as shown in Fig. 3, its pointer will deflect from its normal center scale position by an amount proportional to the product of the in-phase components of the secondary voltages of the transformers 8 and 9. In consequence of the fact that amplifiers 6 and 7 are linear or constant in gain over wide ranges of input voltages, the deflection of the pointer of instrument 11 will be proportional to the product of the in-phase components of the voltages induced, in loops 4 and 5, by the alternating magnetic field surrounding the guidance cable 1.

Whenever the vessel 3 is directly above the cable 1 with its keel parallel to the length of the cable, loop 4 will link with a maximum number of flux lines and its induced voltage will be maximum while loop 5 will link no flux lines and its induced voltage will be zero. The product of a finite voltage multiplied by zero equals zero and in consequence the pointer of instrument 11 will not deflect but will point directly downward toward the cable.

If the vessel is making a course parallel to but on the right hand side of the cable, the voltage induced in loop 4 will be slightly diminished but a finite voltage will be induced in loop 5. The product of the in-phase components of these two voltages is finite and will cause the pointer of instrument 11 to deflect. If the polarity of the connections to instrument 11 are properly selected, the pointer will point to the left in the direction of the cable. If the vessel is making a course parallel to but on the left hand side of the cable, the voltage in loop 5 will be finite and of a phase opposite to that induced in the previous instance and in consequence the pointer of instrument 11 will point to the right in the direction of the cable.

By means of the apparatus described thus far, I provide an indicating instrument which always points in the direction of the piloting cable. This indicating means may be made as sensitive as desired by increasing the gain of amplifiers 6 and 7. Full scale deflection may be obtained if the vessel deviates as little as a foot or two from a position directly above the cable or the sensitivity may be reduced, if desired, to obtain full scale deflection if the vessel deviates 25 or 50 feet either side of the cable.

The practice of this invention is not limited to the use of the bridge rectifier 10. There are other circuits well known to those skilled in the art which will cause an instrument pointer to deflect an amount proportional to the product of the in-phase components of two alternating voltages.

The A. C. voltmeter 12 is connected to the output terminals of amplifier 7 and is adjusted to deflect full scale when the vessel is directly over the guidance cable under which conditions, maximum voltage is induced in loop 4. As the vessel departs from a position directly above the cable, the voltage induced in loop 4 diminishes and the deflection of the pointer of instrument 12 diminishes proportionally. Thus instrument 12 provides an indication of the approximate distance from the vessel to the cable and it may be calibrated in feet or yards if desired. Instrument 12 is of particular value in case the vessel has departed beyond the effective field of the cable. In such cases, zero voltage will be induced in both loop 4 and 5 and the pointer of instrument 11 will point vertically downward as if the vessel were directly over the cable. In such a case, instrument 12 will show that the vessel is at an infinite distance from the guidance cable.

The detecting and indicating equipment described herein may be designed to be portable in order that it may accompany the harbor pilot as he boards and leaves a vessel. It is preferable that the amplifiers 6 and 7 and the transformers 8 and 9 and the bridge rectifier 10 be installed in a single waterproof case which may be placed in the bow of the vessel near the loops 4 and 5 in order that the loop leads may be short. The indicating instruments 11 and 12 may be mounted in a light carrying case which may be placed on the bridge near the helmsman and the instruments may be connected, by means of portable rubber-covered cables temporarily laid on deck, to the rest of the equipment located near the bow.

The voltage induced in loops 4 and 5 is due not only to the current flowing in the portion of the guidance cable immediately below the loops but is due also to the current flowing in portions of the guidance cable which are at distances ahead of the vessel as great as ten times the vertical distance from the cable to the loops. In consequence, indications of an approaching bend in the cable course are received as much as 200 to 500 feet before the vessel reaches the bend. The length of guidance cable beneath and astern of the vessel contributes little to the voltage induced in loops 4 and 5 because of the shielding effect of the steel hull of the vessel. For this reason it is preferable to extend loops 4 and 5 slightly beyond the bow rather than to mount them near the bridge structure.

The invention described herein may be manufactured and used by or for the Government of the United States of America for governmental purposes without the payment of any royalties thereon or therefor.

What I claim is:

1. An electrical guidance system comprising: a source of alternating current; a submerged conductor extending along the desired course of vessels, in circuit with said source; a vessel provided with a steel hull; coil means horizontally mounted on said vessel in a plane perpendicular to the fore and aft plane of said vessel and at a distance in front of the bow inductively coupled with said conductor; coil means vertically mounted on said vessel along the fore and aft plane of said vessel and at a distance in front of the bow inductively coupled with said conductor; an amplifier whose input is connected to said horizontal coil; an amplifier whose input is connected to said vertical coil; a rectifier bridge; a transformer whose primary is connected to the output of said first mentioned amplifier, and whose secondary is connected to opposite corners of said bridge; a transformer whose primary is connected to the output of said second mentioned amplifier, and whose secondary is connected to the remaining two opposite corners of said bridge; a zero-center direct current visual indicating instrument center-tapped to the above secondaries; and an alternating current voltmeter, calibrated to indicate distance from said conductor, connected to the output of said second mentioned amplifier.

2. An electrical guidance system comprising a source of alternating current, a submerged conductor extending along the desired course of vessels energized by said source for producing an oscillating magnetic field, a vessel provided with a steel hull, a vertical coil positioned in the fore and aft plane of said vessel adapted to have alternating voltages induced therein by said oscillating magnetic field, a horizontal coil, identical with and bisecting the plane of said first mentioned coil, adapted to have alternating voltages induced therein by said oscillating magnetic field, means for mounting said coils on said vessel in front of the bow thereof, means for amplifying the voltages induced in each of said coils, means for indicating the voltages induced in said vertical coil and means responsive to the product of the in-phrase components of said amplified voltages for indicating the position of said vessel with respect to said conductor.

EDWARD N. DINGLEY, JR.

REFERENCES CITED

The following references are of record in the file of this patent:

UNITED STATES PATENTS

| Number    | Name      | Date           |
|-----------|-----------|----------------|
| 1,589,398 | Kelley    | June 22, 1926  |
| 2,166,991 | Guanella  | July 25, 1939  |
| 1,787,992 | McIlvaine | Jan. 6, 1931   |
| 1,689,292 | O'Neill   | Oct. 30, 1928  |
| 736,432   | Owens     | Aug. 18, 1903  |

OTHER REFERENCES

Article, "The Flux Navigator," Electronics, Feb. 1943, pp. 74–77.